(12) United States Patent
Stringham

(10) Patent No.: US 9,660,880 B2
(45) Date of Patent: May 23, 2017

(54) NON-COMMITTAL VISITOR STITCHING

(71) Applicant: Adobe Systems Incorporated, San Jose, CA (US)

(72) Inventor: Russell R. Stringham, Orem, UT (US)

(73) Assignee: Adobe Systems Incorporated, San Jose, CA (US)

(*) Notice: Subject to any disclaimer, the term of this patent is extended or adjusted under 35 U.S.C. 154(b) by 233 days.

(21) Appl. No.: 14/547,279

(22) Filed: Nov. 19, 2014

(65) Prior Publication Data

US 2016/0142272 A1 May 19, 2016

(51) Int. Cl.
*H04L 12/26* (2006.01)
*H04L 29/08* (2006.01)

(52) U.S. Cl.
CPC ............ *H04L 43/04* (2013.01); *H04L 43/08* (2013.01); *H04L 67/02* (2013.01); *H04L 67/22* (2013.01)

(58) Field of Classification Search
CPC ......... H04L 43/04; H04L 43/08; H04L 67/02; H04L 67/22
See application file for complete search history.

(56) References Cited

U.S. PATENT DOCUMENTS

| | | | | |
|---|---|---|---|---|
| 6,393,479 B1 * | 5/2002 | Glommen | ............... | G06Q 30/02 709/224 |
| 6,978,270 B1 * | 12/2005 | Carty | .................... | G06Q 30/02 |
| 7,886,047 B1 * | 2/2011 | Potluri | .................... | H04L 67/22 709/224 |
| 8,805,946 B1 * | 8/2014 | Glommen | ............... | H04L 67/10 709/206 |
| 8,874,652 B1 * | 10/2014 | Pecjak | .................... | H04L 67/22 705/14.4 |
| 8,898,808 B1 * | 11/2014 | Kittrell | .................... | H04L 63/10 726/30 |
| 9,203,905 B1 * | 12/2015 | Hong | ...................... | H04L 67/14 |
| 9,210,222 B2 * | 12/2015 | Field | ........................ | H04L 67/14 |
| 2002/0174421 A1 * | 11/2002 | Zhao | ........................ | H04L 67/02 717/174 |
| 2003/0023715 A1 * | 1/2003 | Reiner | .................... | G06F 11/32 709/224 |
| 2003/0055883 A1 * | 3/2003 | Wiles, Jr. | ............ | G06F 11/3414 709/203 |

(Continued)

*Primary Examiner* — Backhean Tiv
(74) *Attorney, Agent, or Firm* — Finch & Maloney PLLC

(57) ABSTRACT

Techniques are provided for transforming information about unique visits to a website or interactions with a mobile application by a single individual on different devices into unified analytical data representing these visits. One or more visitor stitching models can be used to quantify unique visits as belonging to the same person with a certain level of confidence. In addition to maintaining separate records for each unique visit, a unified record is generated, which represents a combination of the unique visits by the same person. Various analytics can then be performed on the unique and unified records. The unified records are favored over the separate data records wherever the stitching model corresponding to the unified record provides a certainty that meets or exceeds a user-specified confidence level. The visitor stitching model used for the analytics is considered non-committal because different models can be employed or none at all, depending on user preferences.

17 Claims, 8 Drawing Sheets

(56) References Cited

U.S. PATENT DOCUMENTS

| | | | | |
|---|---|---|---|---|
| 2007/0088603 | A1* | 4/2007 | Jouppi | G06Q 30/02 705/14.66 |
| 2009/0204704 | A1* | 8/2009 | Muret | H04L 67/22 709/224 |
| 2010/0313009 | A1* | 12/2010 | Combet | G06Q 30/0204 713/150 |
| 2011/0029467 | A1* | 2/2011 | Spehr | G06Q 30/02 706/13 |
| 2012/0324101 | A1* | 12/2012 | Pecjack | H04L 67/02 709/224 |
| 2014/0075018 | A1* | 3/2014 | Maycotte | H04L 67/22 709/224 |
| 2014/0122703 | A1* | 5/2014 | Pugh | H04L 67/22 709/224 |
| 2015/0006712 | A1* | 1/2015 | Khann | H04L 67/18 709/224 |
| 2015/0081617 | A1* | 3/2015 | Shaik | G06F 17/30563 707/602 |
| 2015/0201031 | A1* | 7/2015 | James | H04L 67/22 709/224 |
| 2016/0142272 | A1* | 5/2016 | Stringham | H04L 43/04 709/224 |
| 2016/0364737 | A1* | 12/2016 | Pecjak | G06Q 30/0201 |
| 2016/0371230 | A1* | 12/2016 | Kirillov | G06F 17/212 |
| 2016/0371231 | A1* | 12/2016 | Kirillov | G06F 17/212 |
| 2016/0371710 | A1* | 12/2016 | Pugh | G06Q 30/0201 |

\* cited by examiner

| Visitor | Confidence |
|---|---|
| AB | 90% |
| AC | 90% |
| CD | 90% |
| BC | 85% |
| AD | 80% |
| BD | 75% |
| ABC | 75% |
| ABD | 70% |
| ACD | 70% |
| BCD | 70% |
| ABCD | 65% |
| E & F | <65% |

FIG. 3

| Confidence | Group |
|---|---|
| 91-100% | A, B, C, D, E, F |
| 76-90% | AB, CD, E, F |
| 66-75% | AB, CD, E, F* |
| 0-65% | ABCD, E, F |

* ABC not available because D must remain with C

FIG. 4A

| Confidence | Group |
|---|---|
| 91-100% | A, B, C, D, E, F |
| 76-90% | AC, B, D, E, F |
| 66-75% | ABC, D, E, F |
| 0-65% | ABCD, E, F |

FIG. 4B

| Visitor | Confidence | |
|---|---|---|
| A | 0 | ⎫ |
| B | 0 | ⎪ |
| C | 1 | ⎪ Unique |
| D | 1 | ⎬ Visits |
| E | 1 | ⎪ |
| F | 1 | ⎭ |
| AB | 1 | ⎫ Single Visits/ |
| CD | 0 | ⎬ Unified |
| ABCD | 0 | ⎭ Visits |

FIG. 5A

NON-COMMITTAL VISITOR STITCHING

FIELD OF THE DISCLOSURE

This disclosure relates to the field of data processing, and more particularly, to techniques for transforming information about unique website visits into analytical data.

BACKGROUND

Website analytics is the measurement, collection, analysis and reporting of data relating to the usage of a website by various visitors. This information provides insight into visitor interactions and can be useful for optimizing website performance. Some existing website analytics techniques track anonymous and unidentified visitors based on cookies, device identification numbers or other data provided by a web browser. For instance, if a particular person visits a website multiple times using the same browser, each of those visits can be associated with the same person using cookies stored by the browser. This is one form of so-called visitor stitching, a process by which several distinct visits to a website by the same person are combined or otherwise associated with one another for analytical purposes. The analytics about a given person can then be converted into actionable intelligence, for example, in the context of a marketing strategy. For instance, if a given person frequently visits a website that sells a particular product, that person may be put on a mailing list to receive a copy of a catalogue from a company that sells that product.

BRIEF DESCRIPTION OF THE DRAWINGS

The accompanying drawings are not intended to be drawn to scale. In the drawings, each identical or nearly identical component that is illustrated in various figures is represented by a like numeral.

FIG. 3 shows an example list of unified visit records and confidence levels corresponding to each record, in accordance with an embodiment of the present invention.

FIG. 4A shows an example set of visit record groupings, in accordance with an embodiment of the present invention.

FIG. 4B shows another example set of visit record groupings, in accordance with an embodiment of the present invention.

FIG. 5A shows an example table of visits, in accordance with an embodiment of the present invention.

DETAILED DESCRIPTION

Figure 1:
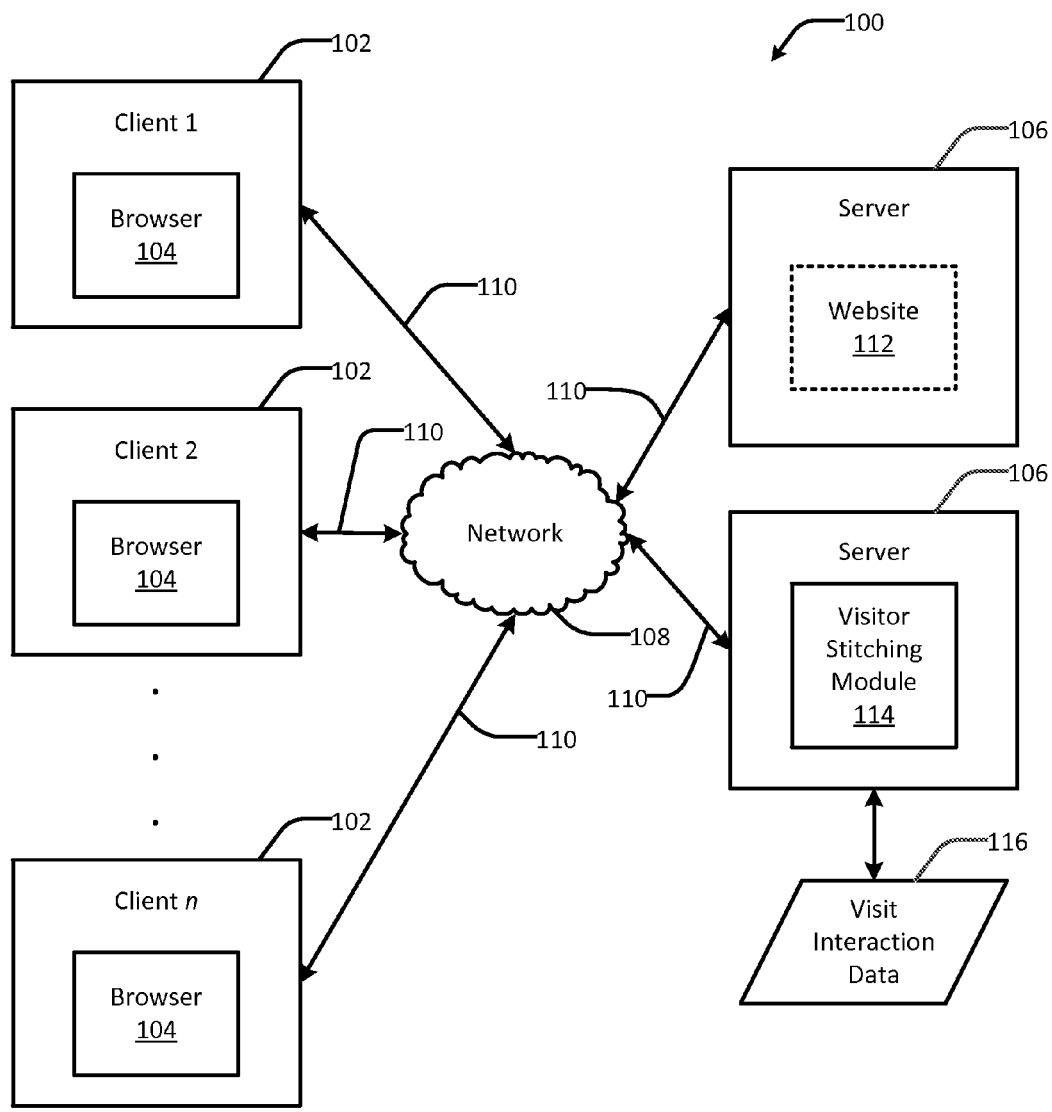
FIG. 1 illustrates an example system for transforming information about unique visits to a website into analytical data, in accordance with an embodiment of the present invention.

Website proprietors often wish to learn about how a particular visitor interacts with a website over the course of several distinct visits. These interactions are difficult to track when the visitors are anonymous or not uniquely identifiable. In some cases, browser-specific cookies or other metadata can be used to assess the certainty that two or more distinct visits involve the same person. However, many people now use more than one electronic device in the course of their daily lives. For instance, it is common for some people to visit websites using desktop and laptop computers while at home. Away from home, these same people use smartphones and tablets, which are also capable of accessing web-based content. Furthermore, even if an individual uses only one device, it is not uncommon for the cookies to be removed between sessions or for that person to use more than one browser to access the same website. Existing analytics techniques are not capable of providing a unified view of interactions on a per-visitor basis when the visitors are not uniquely identifiable. As a result, distinct website visits by the same user may be undercounted.

To this end, and in accordance with an embodiment of the present invention, techniques are provided for transforming information about unique visits to a website or interactions with a mobile application by a single individual into unified analytical data representing these visits. One or more visitor stitching models can be used to quantify unique visits as belonging to the same person with a certain level of confidence. In addition to maintaining separate records for each unique visit, a unified record is generated, which represents a grouping of the unique visits by the same person. Various analytics can then be performed on the unique and unified records. The unified visit records are generally favored over the unique visit records wherever the stitching model provides a level of confidence that meets or exceeds a user-desired confidence level for a given grouping of unique visits. In this sense, the visitor stitching model used for the analytics is considered non-committal because different models and visit groupings can be employed at runtime or none at all, depending on user preferences. Numerous configurations and variations will be apparent in light of this disclosure.

As used in this disclosure, the term "visit interaction data" represents information about user interactions with a website, a device, a mobile application, a call center or other company entity. For example, one interactive session with the website may represent a single unique visit, while two distinct interactive sessions may represent two unique visits. In accordance with an embodiment of the present invention, one or more visitor stitching models can be used to stitch together visit interaction data representing several unique visits by the same visitor. Non-limiting examples of such stitching models are those that are based on known user-specific data such as log-in information, Internet Protocol (IP) address, probabilistic based models or device signatures. Each stitching model produces a level of certainty that two or more unique visits are actually visits from the same individual. For example, one stitching model may indicate that visit A and visit B are visits from the same person with an 80% level of confidence, while another stitching model may provide a 75% level of confidence for the same grouping of visits A and B. In another example, one stitching model may indicate that visits A, B and C are visits from the same person with a 65% level of confidence, while the same stitching model may indicate that visits A and B (excluding C) are visits from the same person with a 70% level of confidence. Accordingly, different stitching models can be selected depending on the desired level of confidence in the results.

As used in this disclosure, the term "unique visit interaction data" refers to visit interaction data representing a single visit by a single visitor.

As used in this disclosure, the term "unified visit interaction data" refers to visit interaction data representing more than one unique visit by a single visitor. For example, unique visit interaction data from several visits can be stitched, using a stitching model, or otherwise combined into unified visit interaction data.

As used in this disclosure, the term "visit" refers to one or more interactions with an entity. Examples of entities may include, but are not limited to, a webpage, a website, a group of related websites, a call center, a mobile app, a computer application, an embedded process running on a device or the device itself. Examples of devices include, but are not limited to, computers, tablets, cell phones, wearables such as smart watches, Google glass or fitness tracking devices, and IoT (the Internet of Things) devices like Internet connected refrigerators, thermostats, lighting, etc.

As used in this disclosure, the terms "visitor" and "user" refer to an individual or multiple individuals who own or use the devices, or initiate or perform interactions in a visit. A visitor may also include a group of individuals, such as those that share a household or that work for the same company. Examples of such interactions include using a browser to view a webpage, starting or stopping a mobile application, clicking a button in an application, taking a reading with a thermometer or heart rate monitor, watching a video segment, being shown an ad or commercial, receiving an email or other notification or making a phone call.

Multiple interactions with the same entity can be grouped into a single visit or split into multiple visits. Grouping into a visit may occur, but is not limited to, during interactions that occur within a specified time period (e.g., all interactions that occur during the same hour or same day), interactions that occur within a specified time after a previous interaction (e.g., less than thirty minutes since the previous interaction), interactions that are based on one or more events (e.g., interactions with an application from the time a user launches the application until the application is terminated), or by other methods. Various techniques can be used to determine that each interaction in a visit is associated with the same visitor. These include a web browser cookie, an application ID, a device ID, or a cookie-less ID, such as a device signature. A visit can also include all interactions with an entity or by a device for as long as the browser cookie, device ID or other identifier persists.

In accordance with an embodiment, data associated with separate visits by a single user that involve two or more apps, devices or cookies (e.g., cookies C and X) are joined together into a unified visit record. The unified record includes data associated with all previously occurring visits and any new visits by the same user that occur after the unified record is created for these apps, devices or cookies. Attribution of these visits within the unified record is adjusted, as necessary, to eliminate duplicates and avoid undercounting. Furthermore, visits that involve two or more apps, devices or cookies are treated as belonging to either a single visitor (e.g., a single user identified by both cookies C and X) or two separate visitors (e.g., a first user identified by cookie C and a second user identified by cookie X) depending on the desired confidence level of the result. In this manner, different stitching models can be used to stitch together visit interaction data in different ways to achieve results having different levels of certainty. The user can select which stitching model(s) and confidence level(s) to use.

Example System

FIG. 1 illustrates an example client-server system 100 for transforming information about unique website visits into analytical data, in accordance with an embodiment. The system 100 includes one or more client computing devices 102 and one or more servers 106. Generally, each client 102 can include any type of device, such as a personal computer (PC), tablet, or smart phone, configured to send and receive data 110 via a communications network 108, such as the Internet or an intranet. The data 110 may represent any type of information in digital form, such as text, documents, images, videos, audio recordings, web content, etc. The client 102 may include a web browser 104 or other means of interacting with a website or other company entity. One of the servers 106 hosts a website 112 or other data sharing or gathering means and another one of the servers (or a cluster of servers) 106 includes a visitor stitching module 114, although it will be understood that the website 112 and the visitor stitching module 114 may be on the same server. Visit interaction data 116 includes information about user interactions with the website 112, and may be stored, for example, in a database or on a cloud storage system. The visit interaction data 116 can be updated or modified to record unique visits to the website 112 by any of the computing devices 102. The visit interaction data 116 can also be modified by the visitor stitching module 114. For example, such as described in further detail below, groupings of unique visits to the website 112 may be stitched together or otherwise aggregated into unified visit records. The visit interaction data 116 may represent both the unique visits and the unified visits. Analytics reports can be run using the visit interaction data 118.

Figure 2:
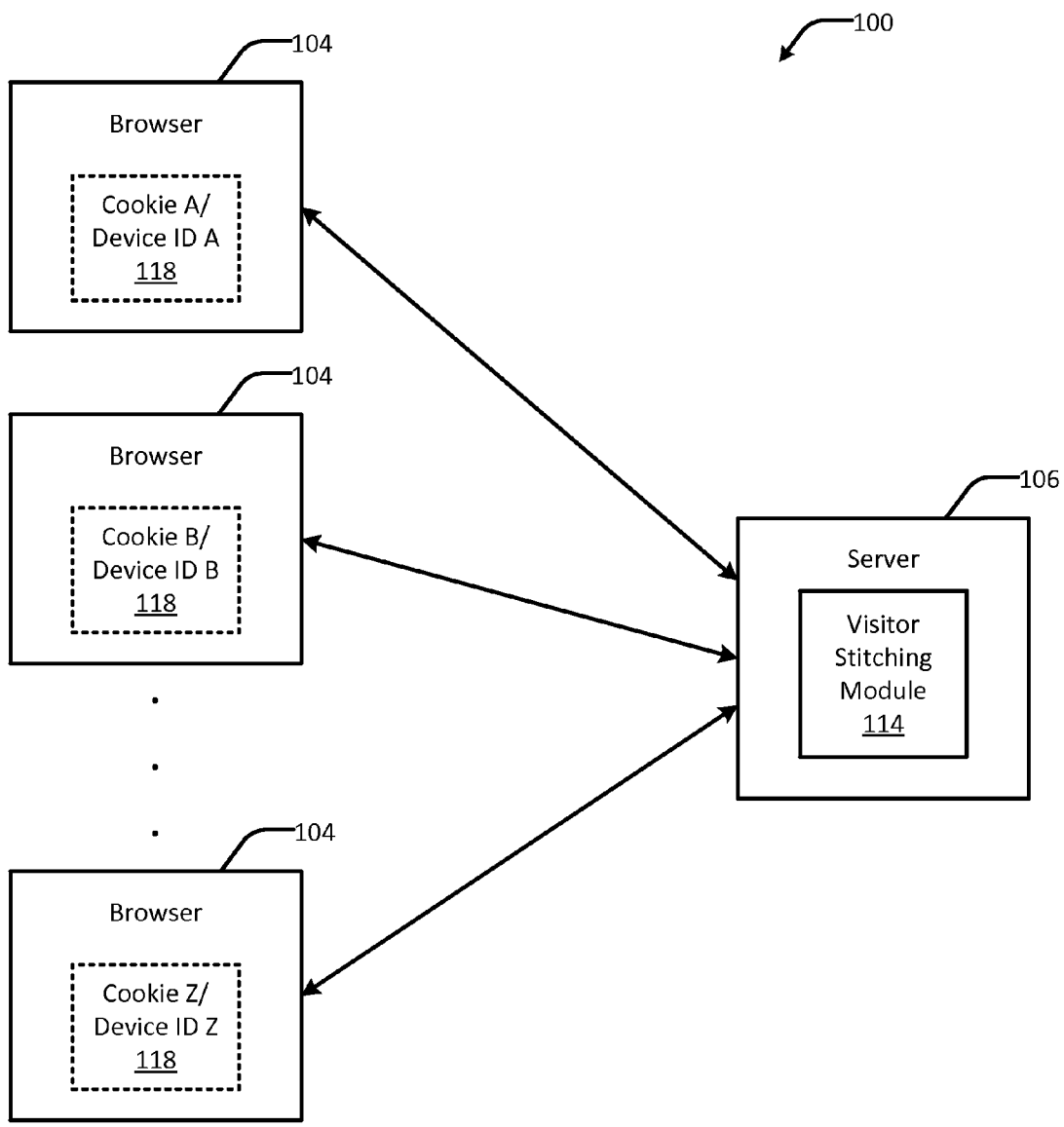
FIG. 2 illustrates a portion of the example system of FIG. 1 in further detail, in accordance with an embodiment of the present invention.

FIG. 2 illustrates a portion of the example system 100 of FIG. 1 in further detail, in accordance with an embodiment. Each browser 104 or client 102 can have a cookie, device ID, or other identifying information 118 associated with the browser 104 or client 102. The cookies/device IDs 118 can be sent to the server 106 via the network 108. The cookies/device IDs 118 may, for example, be used by the server 106 and visitor stitching module 114 to uniquely identify one browser 104 or client 102 from another. More particularly, the cookie/device ID 118 can represent information relating to one or more unique visits to the website 112. For instance, cookie A may represent one website visit, and cookie B may represent a separate visit by the same or different browsers 104 or devices 102. It will be understood that in some embodiments, the same browser 104 or client 102 can have more than one cookie/device ID 118 (e.g., if one cookie is deleted between website visits, a second, unique cookie may be created for subsequent visits using the same browser 104 or client 102).

Example Use Case

FIG. 3 shows an example list of unified and unique visit records and confidence levels corresponding to each record, in accordance with an embodiment. In this embodiment, visit interaction data for one or more distinct visits A, B, C, D, E and F is retrieved. Using one or more visitor stitching models, the visit interaction data is reprocessed to produce one or more unified visit records in which unique visits from two or more devices or cookies are grouped together or aggregated, which are generally indicated at 302 (e.g., AB, AC, CD, BC, etc.). For example, the unique visit records A and B may be aggregated to form unified visit record AB. The unified visit record (e.g., AB) represents visitor interactions by the same individual using several different devices, apps, browsers or browsing sessions. For a given unique visit (e.g., visit A), each visitor stitching model indicates which, if any, other unique visits (e.g., visits B, C, D, E, F, or any combination of these) have a reasonable probability of originating from the same person. These probabilities may be expressed as confidence levels. For example, a 90% confidence level indicates that there is a 9-in-10 probability that visits A and B originate from the same person. The probabilities may vary depending on which the stitching model is used, since different models can produce different results. Additionally, unique visit records are preserved for each unique visit that does not have a reasonable probability (e.g., less than 65% certainty) of originating from the same person, generally indicated at 304 (e.g., visits E and F). A confidence level, generally indicated at 306, is associated with each unified record. For example, according to the visitor stitching model there is a 70% level of confidence that visits B, C, and D originate from the same person, and less than 65% confidence that visits E or F originate from the same person as A, B, C or D. New visits (e.g., by the same device or browser as visits A, B, C, D, E and F) are processed by the visitor stitching algorithm and added to both the corresponding unified visit record (e.g., AB) and the unique visit records (e.g., A, B, C, D, E and F), respectively. In some embodiments, the confidence level may be expressed in an alternate form, such as a range from 0 to 1000 or from −100 to +100, with a letter grade (e.g., A, B, C, D or F), or with another measurement. It will be understood that any measurement can be applied as long as the various grades, rankings, confidence levels or other measurements can be compared to each other or treated as Boolean values (e.g., use and don't use).

The grouping of different visits, such as the unified visits identified in 302, cannot all be used in a report, along with all of the individual visits, without over counting some of the visits. For example, visit B is part of groups AB, BC, BD, ABC, ABD, BCD and ABCD, so using all of these groupings would result in counting B seven times (eight if B by itself is also included). To avoid this problem, a method, in accordance with an embodiment, can be used to select which unique visits and which unified visits should be used within a report. Some such methods support creating separate groups of unique and unified visits that differ for different confidence levels of the visitor stitching algorithm. One embodiment will now be described; however, other variations for selecting the visits and groupings of visits to use will be apparent.

According to an embodiment, the unified visit that has the highest confidence level is selected from the set of all identified potential unified visits. If multiple unified visits have the same confidence level, the unified visit that contains the most unique visits is selected. If there are still more than one, one unified visit is chosen at random. In some cases, additional criteria can be applied before resorting to random selection. For example, in 302, the unified visits with the highest confidence level are AB, AC and CD. Since all unified visits in this example have the same number of unique visits, one is elect, such as AB. AB will now be used for reports at confidence levels 0% to 90%. Next, remove from further consideration all unified visits that contain A or B but not both A and B. This prevents over counting A and B while avoiding inconsistent reporting results where AB are together at a high confidence level but potentially apart at lower confidence levels. This removes AC, AD, BC, BD, ACD and BCD from the list of potential unified visits. Repeat these steps for unified visits that remain. In the second iteration, CD is the only unified visit remaining with a probability of 90%, so it is selected, and used for reporting at confidence levels 0% to 90%. ABC and ABD are removed from the remaining unified visits, leaving only ABCD. In the third iteration, ABCD is selected at a confidence level of 0%-65%. If a unified visit selected during an iteration includes a subset of visits that occur as a unified visit at a higher level, the lower range of confidence for those unified visits is adjusted to be above the confidence level of the selected unified visit. In this example, AB and CD are adjusted so their confidence levels are 66% to 90%. When no unified visits remain, if an individual visit is not part of a unified visit at a given confidence level, the unique visit is used at that confidence level. The result of this example is shown in FIG. 4A.

FIG. 4A shows an example set of unified visit record groupings, in accordance with an embodiment. The example set of groupings is based on the confidence levels corresponding to a given visitor stitching model. For example, referring to the list in FIG. 3, the unique visits A, B, C and D, according to the visitor stitching model, have a 65% certainty of originating from the same individual. Therefore, for any analytics report in which a confidence level of 65% or less is desired, the unified visit record ABCD will be used. Referring again to FIG. 3, unified visit AB has a 90% certainty of originating from the same individual, as does unified visit CD for a different individual. Since two or more visits that are combined into a unified visit record must remain grouped together at lower confidence levels, it is not possible to use unified records AC, BC, AD, BD, ABC, ABD, ACD or BCD with this particular stitching model and grouping selection, once AB and CD have been selected for use at confidence level 90%. Thus, as shown in FIG. 4A, unified records AB and CD can be used for any analytics report in which a confidence level between 66% and 90% is desired. Unique visit records A, B, C, D, E and F are used for all analytics reports in which a confidence level over 90% is desired. Unique visit records E and F are also used for reports at all confidence levels below 90%, while the unique visit records for A, B, C and D are not. Note that alternative groupings are possible. For example, FIG. 4B shows another example set of visit record groupings, in which unified visit AC is used instead of unified visits AB and CD, as in FIG. 4A, which allows unified visit ABC to be used at a lower confidence level.

These visit groupings at different confidence levels can then be converted to a table of visits to facilitate selecting the appropriate visit groupings at report time. FIG. 5A shows an example table of visits, in accordance with an embodiment. The table of visits (or other suitable data structure) includes a single column for a certain type of visitor stitching model (e.g., login type). The rows of the table represent unique visit records (e.g., A, B, C, D, E and F) and unified visit records (e.g., AB, CD, ABCD). The unified visits are unique visits by the same individual that are stitched together using the stitching model. This single column contains a Boolean value, which is true (1) if the corresponding record should be used for producing analytics reports using the given visitor stitching model, and false (0) otherwise. For example, if the visitor stitching model indicates that visits A and B are from the same individual with sufficient certainty (e.g., 100% certainty or other previously determined level of certainty), the single column value for AB may be true, while the single column value may be false for both A and B. In this case, when a report is run or a query is performed, which uses the visitor stitching algorithm associated with this table, based on the Boolean value in the table, the unified visit record AB and unique visit records C, D, E and F can be used for running an analytics report. The unique visit records A and B are not used for this report to avoid double-counting these visits. Unified visit records CD and ABCD are also not used for the same reason and because this visitor stitching algorithm didn't identify them as being associated with an individual.

Figure 5B:
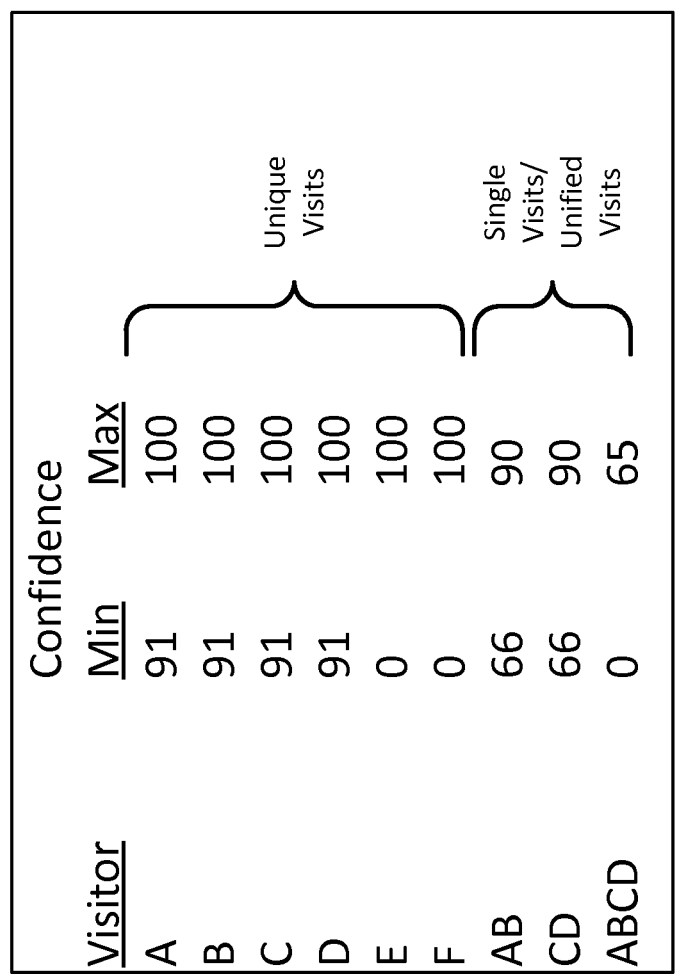
FIG. 5B shows another example table of visits, in accordance with an embodiment of the present invention.

FIG. 5B shows another example table of visits, in accordance with an embodiment. This table includes two columns for each type of stitching algorithm that produces unified visit records having a range of confidence levels. These two columns represent minimum and maximum confidence levels for which the corresponding unique and unified visit records are utilized when running an analytics report utilizing the given visitor stitching model. FIG. 5B illustrates the results of applying the visitor stitching algorithm shown in FIG. 3 and the visit groupings show in FIG. 4A. Alternately, one may derive the table of visits as shown if FIG. 5B by repeating the analysis. For example, if a given visitor stitching model indicates that visits A and B are from the same individual with 90% certainty, and visits A, B, C and D are from the same individual with 65% certainty, then the two columns corresponding to the unified visit record AB are assigned values of 66 and 90. This is because if two or more visits are part of the same unified visit record at a particular confidence level, these same visits must remain together as part of any unified visit records at a lower confidence level. Therefore, to avoid over-counting, unified visit record AB will only be used when unified visit record ABCD is not used (e.g., when the desired confidence level of the analytics is greater than 65%). The two columns corresponding to unique visit records A and B, respectively, are assigned a minimum value of 91 and a maximum of 100, since the maximum confidence level of unified visit record AB is 90%. Thus, for example, if a user runs an analytics report targeting 95% certainty of stitched visitors, then the data associated with the separate A and B records are utilized. If, on the other hand, the desired certainty is, for example, 85%, then the data associated with the combined AB record is utilized, while the data associated with the separate A and B records are excluded to avoid double-counting.

In some embodiments, the table of visits can be extended by adding a pair of columns or a single Boolean column for each of several visitor stitching models, or separate tables can be generated for each model. Any grouping of visits that is common to two or more models is represented in the table by the same unified visit record. Any grouping that occurs in one stitching model but not others has both the corresponding minimum and maximum probability values set to zero for the models where the grouping does not exist. This prevents use of those records in conjunction with stitching models that do not support those groupings. In any table of visits, it may be acceptable to omit unique visit records (such as E & F) that are never part of a unified visit for the stitching algorithm(s) for that table. These omitted records are treated as if they had a Boolean value of true (1) or a range of certainty above 0% (up to and including 100%). This keeps these tables much smaller and makes them easier to maintain. Similarly, if separate visit tables are used, a unified visit, for example AC, may appear in one table and not others. For tables in which it does not appear, it can be treated as if it had a Boolean value of false (0) or 0% certainty. In some cases, stitching probabilities can be specified as a matrix, with one row and column for each visit, and the value at each cell being the probability of the visits corresponding to the row and column associated with the same visitor. The matrix can be extended to a cube or hypercube for specifying the probabilities of three or more visits being the same visitor.

According to an embodiment, each time an analytics report is run, a query is supplied. The query specifies a visitor stitching model and a minimum confidence level, in addition to any other parameters. As noted above, the confidence level is the degree of certainty that a given visitor stitching model produces for a set of input data. Unique or unified visit interaction data is used for generating the report if the confidence level specified for the report falls between the minimum and maximum confidence level values for the associated visit interaction data. In some cases, the table of visits can be generally constructed prior to a report being run, so that the unified visit records can also be combined prior to the report being run, as this combining may be computationally or temporally expensive. In some other embodiments, the unique visit records (e.g., A and B) are combined into a unified visit record (e.g., AB) at report time rather than prior to report time, but only if the selected visitor stitching algorithm says with sufficient confidence that they should be combined. In this case, the table of visits may also be created at report time. Other examples will be apparent in view of this disclosure. The report may be an analytics report that provides statistics about the visitors to a website or the users of an application, or statistics about all interactions of individuals with a company or other entity. The report may be used to create targeted advertisements for each individual, where the targeting may utilize insights gained from the stitched visits to better understand the interests of the individual or it may use insights gained from one of the devices or entities for advertisements or offers sent to a different device or entity for that individual.

Example Methodology

Figure 6:
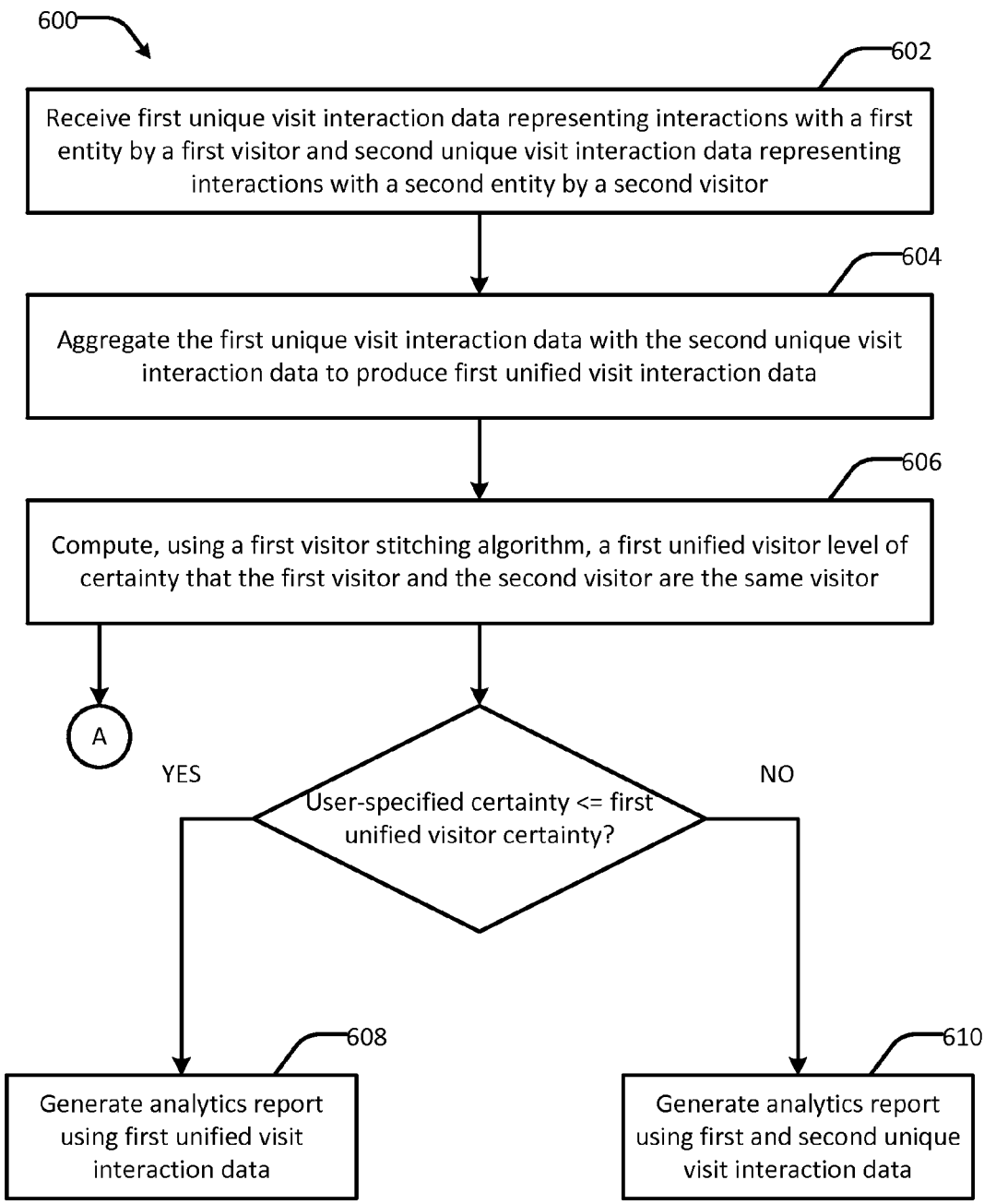
FIGS. 6 and 7 are flow diagrams of an example methodology for transforming information about unique visits to a website into analytical data, in accordance with an embodiment of the present invention.
Figure 7:
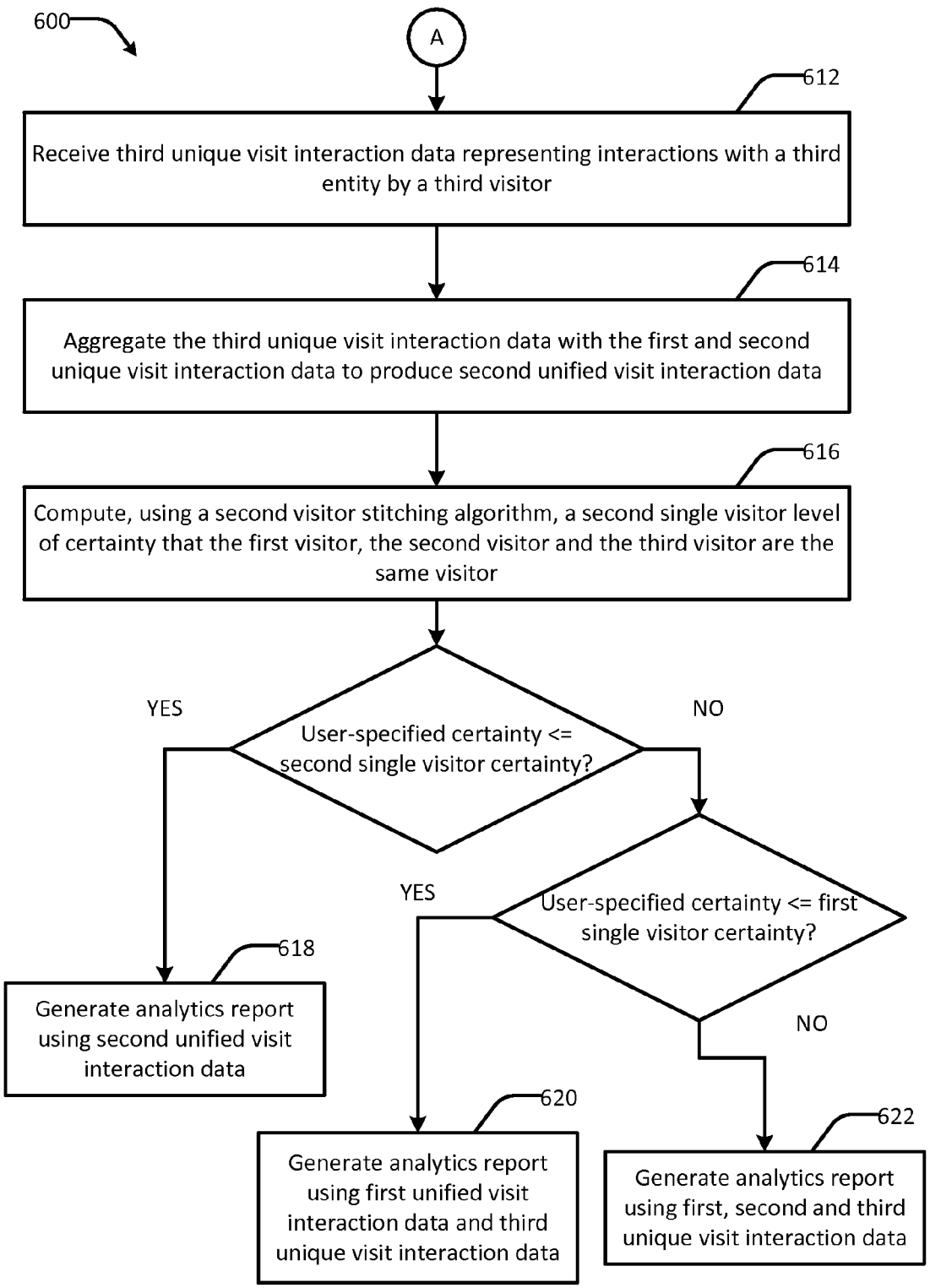

FIGS. 6 and 7 are flow diagrams of an example methodology 600 for transforming information about unique visits into analytical data, in accordance with an embodiment. The example methodology 600 may, for example, be implemented by the visitor stitching module 114 of FIG. 1. Referring first to FIG. 6, the method 600 begins by receiving 602 first unique visit interaction data representing interactions with an entity by a first visitor and second unique visit interaction data representing interactions with the entity by a second visitor. In some cases, a visitor can include any entity or device owned by, controlled by, or associated with the visitor. The interactions with the website or other entity by the first visitor can occur on the same computing device as the interactions with the website or entity by the second visitor (e.g., same or different browser on the same computer), or the interactions can occur on different computing devices (e.g., a browser on a laptop PC and an app on a smartphone or other mobile device). The method 600 continues by aggregating 604 the first unique visit interaction data with the second unique visit interaction data to produce first unified visitor interaction data. The method 600 continues by computing 606, using a first visitor stitching algorithm, a first unified visitor level of certainty that the first visitor and the second visitor are the same visitor based on the first and second unique visit interaction data or other data. Such other data may include, for example, publicly available records (e.g., to link a phone number provided in one interaction with an address provided in another interaction) or other information external to the interactions. The first visitor stitching algorithm may be, for example, a login-type stitching algorithm, an Internet Protocol (IP) address-type stitching algorithm, or probabilistic stitching algorithm. The method 600 continues by generating an analytics report using the first unified visit interaction data if a user-specified level of certainty is less than or equal to the first unified visitor level of certainty (608), or each of the first and second visit interaction data otherwise (610).

Referring next to FIG. 7, in some cases, the method 600 includes receiving 612 third unique visit interaction data representing interactions by a third visitor, aggregating 614 the third unique visit interaction data with the first and second unique visit interaction data to produce second unified visit interaction data, and computing 616, using a second visitor stitching algorithm, a second unified visitor level of certainty that the first visitor, the second visitor and the third visitor are the same visitor based on the first, second and third unique visit interaction data. The second visitor stitching algorithm may be, for example, a login-type stitching algorithm, an Internet Protocol (IP) address-type stitching algorithm, or probabilistic stitching algorithm. In these cases, the generating of the analytics report uses the second unified visit interaction data if the user-specified level of certainty is less than or equal to the second unified visitor level of certainty (618), or the first unified visit interaction data and the third unique visit interaction data if the user-specified level of certainty is less than or equal to the first unified visitor level of certainty (620), or each of the first, second and third unique visit interaction data otherwise (622).

Example Computing Device

Figure 8:
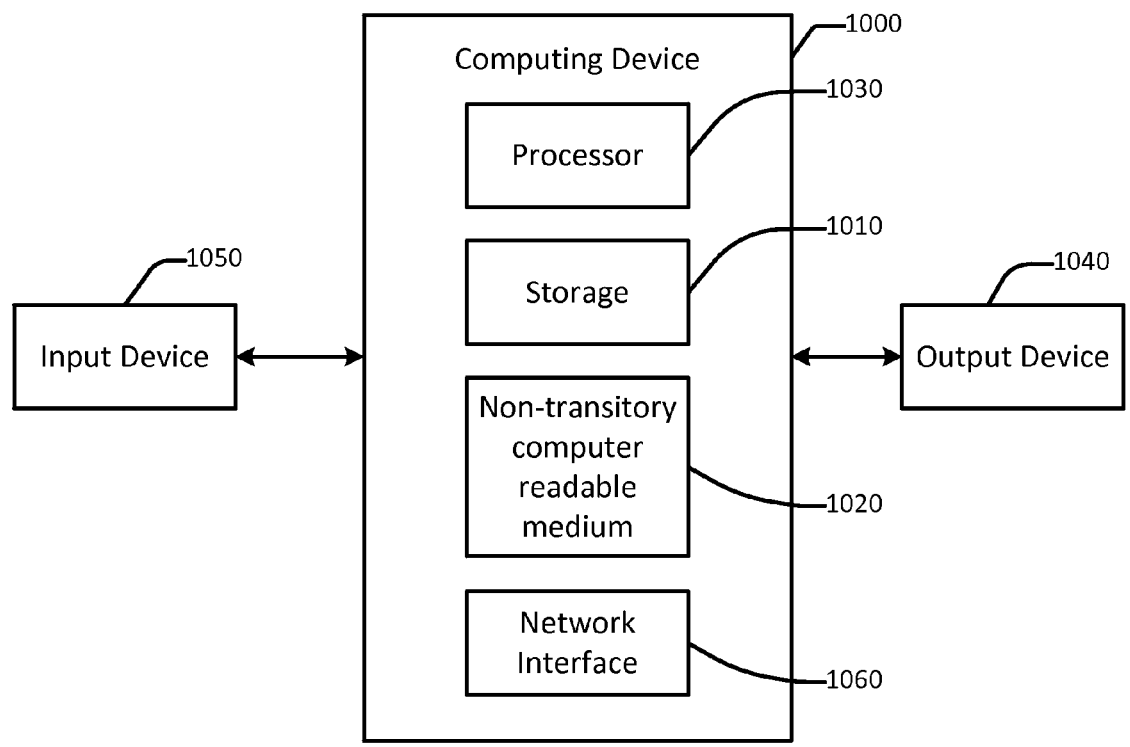
FIG. 8 is a block diagram representing an example computing device that may be used in accordance with an embodiment of the present invention.

FIG. 8 is a block diagram representing an example computing device 1000 that may be used to perform any of the techniques as variously described in this disclosure. For example, the client 102, server 106, the visitor stitching module 114, the cookie/device id 118, or any combination of these (such as described with respect to FIG. 1) may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described in this disclosure. For instance, the computing device may include or be operatively coupled to a network interface 1060 for communicating with other devices via a network, such as the Internet.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the website 112 and visitor stitching module 114, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the client(s) 102 and the server(s) 106, can be integrated into, for example, one or more desktop or laptop computers, workstations, tablets, smartphones, game consoles, set-top boxes, fitness tracking and health monitoring devices, IoT devices or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving first unique visit interaction data representing interactions with a first entity by a first visitor and second unique visit interaction data representing interactions with a second entity by a second visitor; aggregating the first unique visit interaction data with the second unique visit interaction data to produce first unified visit interaction data; computing, using a first visitor stitching algorithm, a first unified visitor level of certainty that the first visitor and the second visitor are the same visitor based on the first and second visit interaction data or other data; and generating an analytics report using: the first unified visit interaction data while a user-specified level of certainty is less than or equal to the first unified visitor level of certainty; and each of the first and second unique visit interaction data while the user-specified level of certainty is greater than the first unified visitor level of certainty. In some cases, the aggregation of the first and second unique visit interaction data is performed in advance of running the report. In some such cases, the first unified level of certainty is above a minimum threshold. In some cases, the process includes receiving additional first unique visit interaction data and aggregating the additional first unique visit interaction data with the first unified visit interaction data. In some such cases, the process includes receiving additional second visit interaction data and aggregating the additional second visit interaction data with the first unified visit interaction data. In some cases, the first entity and the second entity are the same entity. In some cases, the process includes receiving third unique visit interaction data representing interactions with a third entity by a third visitor; aggregating the third unique visit interaction data with the first and second unique visit interaction data to produce second unified visit interaction data; and computing, using a second visitor stitching algorithm, a second unified visitor level of certainty that the first visitor, the second visitor and the third visitor are the same visitor, where the generating of the analytics report uses: the second unified visit interaction data while the user-specified level of certainty is less than or equal to the second unified visitor level of certainty; the first unified visit interaction data and the third unique visit interaction data while the user-specified level of certainty is less than or equal to the first unified visitor level of certainty; and each of the first, second and third unique visit interaction data while the user-specified level of certainty is greater than the first and second unified visitor levels of certainty. In some cases, the interactions with the first entity by the first visitor occur on the same computing device as the interactions with the second entity by the second visitor. In some cases, the report is used to target an advertisement to the first visitor using one of information obtained from the first unified visit interaction data where the first unified visit interaction data is used for the report, and information obtained from the first unique visit interaction data where the first unified visit interaction data is not used for the report. In some cases, the interactions with the first entity by the first visitor and the interactions with the second entity by the second visitor occur on different computing devices. In some cases, the first visitor stitching algorithm is a login-type stitching algorithm, an Internet Protocol (IP) address-type stitching algorithm, or probabilistic stitching algorithm. In some cases, the first visitor stitching algorithm is the same as the second visitor stitching algorithm. In some other cases, the first and second visitor stitching algorithms are different. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
receiving, by a processor, first unique visit interaction data representing interactions with a first entity by a first visitor and second unique visit interaction data representing interactions with a second entity by a second visitor;
receiving, by the processor, third unique visit interaction data representing interactions with a third entity by a third visitor;
aggregating, by the processor, the first unique visit interaction data with the second unique visit interaction data to produce first unified visit interaction data;
aggregating, by the processor, the first unified visit interaction data with the third unique visit interaction data to produce second unified visit interaction data;
computing, by the processor using a first visitor stitching algorithm, a first unified visitor level of certainty that the first visitor and the second visitor are the same visitor;
computing, by the processor using a second visitor stitching algorithm, a second unified visitor level of certainty that the first, second and third visitors are the same visitor, the second unified visitor level of certainty being different than the first unified level of certainty; and
generating, by the processor, a report using:
the first unified visit interaction data and the third unique visit interaction data while a user-specified level of certainty is less than or equal to the first unified visitor level of certainty and greater than the second unified visitor level of certainty;

the second unified visit interaction data while the user-specified level of certainty is less than or equal to the second unified visitor level of certainty; and each of the first, second and third unique visit interaction data while the user-specified level of certainty is greater than the first and second unified visitor levels of certainty.

2. The method of claim 1, further comprising receiving, by the processor, additional first unique visit interaction data and aggregating the additional first unique visit interaction data with the first unified visit interaction data.

3. The method of claim 1, wherein the report is used to target an advertisement to the first visitor using one of information obtained from the first unified visit interaction data where the first unified visit interaction data is used for the report, and information obtained from the first unique visit interaction data where the first unified visit interaction data is not used for the report.

4. The method of claim 1, wherein the interactions with the first entity by the first visitor occur on a same computing device as the interactions with the second entity by the second visitor.

5. The method of claim 1, wherein the interactions with the first entity by the first visitor and the interactions with the second entity by the second visitor occur on different computing devices.

6. The method of claim 1, wherein the first visitor stitching algorithm is one of a login-type stitching algorithm, an Internet Protocol (IP) address-type stitching algorithm, and a probabilistic stitching algorithm.

7. A system comprising:
a storage;
a processor operatively coupled to the storage, the processor configured to execute instructions stored in the storage that when executed cause the processor to carry out a process comprising:
  receiving first unique visit interaction data representing interactions with a first entity by a first visitor and second unique visit interaction data representing interactions with a second entity by a second visitor;
  receiving third unique visit interaction data representing interactions with a third entity by a third visitor;
  aggregating the first unique visit interaction data with the second unique visit interaction data to produce first unified visit interaction data;
  aggregating the first unified visit interaction data with the third unique visit interaction data to produce second unified visit interaction data;
  computing, using a first visitor stitching algorithm, a first unified visitor level of certainty that the first visitor and the second visitor are the same visitor;
  computing, using a second visitor stitching algorithm, a second unified visitor level of certainty that the first, second and third visitors are the same visitor, the second unified visitor level of certainty being different than the first unified level of certainty; and
  generating a report using:
    the first unified visit interaction data and the third unique visit interaction data while a user-specified level of certainty is less than or equal to the first unified visitor level of certainty and greater than the second unified visitor level of certainty;
    the second unified visit interaction data while the user-specified level of certainty is less than or equal to the second unified visitor level of certainty; and
    each of the first, second and third unique visit interaction data while the user-specified level of certainty is greater than the first and second unified visitor levels of certainty.

8. The system of claim 7, wherein the process includes receiving additional first unique visit interaction data and aggregating the additional first unique visit interaction data with the first unified visit interaction data.

9. The system of claim 7, wherein the aggregation of the first and second unique visit interaction data is performed in advance of running the report.

10. The system of claim 7, wherein the interactions with the first entity by the first visitor occur on a same computing device as the interactions with the second entity by the second visitor.

11. The system of claim 7, wherein the interactions with the first entity by the first visitor and the interactions with the second entity by the second visitor occur on different computing devices.

12. The system of claim 7, wherein the first visitor stitching algorithm is one of a login-type stitching algorithm, an Internet Protocol (IP) address-type stitching algorithm, and a probabilistic stitching algorithm.

13. A non-transitory computer program product having instructions encoded thereon that when executed by one or more processors cause a process to be carried out, the process comprising:
receiving first unique visit interaction data representing interactions with a first entity by a first visitor and second unique visit interaction data representing interactions with a second entity by a second visitor;
receiving third unique visit interaction data representing interactions with a third entity by a third visitor;
aggregating the first unique visit interaction data with the second unique visit interaction data to produce first unified visit interaction data;
aggregating the first unified visit interaction data with the third unique visit interaction data to produce second unified visit interaction data;
computing, using a first visitor stitching algorithm, a first unified visitor level of certainty that the first visitor and the second visitor are the same visitor;
computing, using a second visitor stitching algorithm, a second unified visitor level of certainty that the first, second and third visitors are the same visitor, the second unified visitor level of certainty being different than the first unified level of certainty; and
generating a report using:
  the first unified visit interaction data and the third unique visit interaction data while a user-specified level of certainty is less than or equal to the first unified visitor level of certainty and greater than the second unified visitor level of certainty;
  the second unified visit interaction data while the user-specified level of certainty is less than or equal to the second unified visitor level of certainty; and
  each of the first, second and third unique visit interaction data while the user-specified level of certainty is greater than the first and second unified visitor levels of certainty.

14. The non-transitory computer program product of claim 13, wherein the process includes receiving additional first unique visit interaction data and aggregating the additional unique first visit interaction data with the first unified visit interaction data.

15. The non-transitory computer program product of claim 13, wherein the report is used to target an advertisement to the first visitor using one of information obtained from the first unified visit interaction data where the first unified visit interaction data is used for the report, and information obtained from the first unique visit interaction data where the first unified visit interaction data is not used for the report.

16. The non-transitory computer program product of claim 13, wherein the interactions with the first entity by the first visitor occur on a same computing device as the interactions with the second entity by the second visitor.

17. The non-transitory computer program product of claim 13, wherein the interactions with the first entity by the first visitor and the interactions with the second entity by the second visitor occur on different computing devices.

* * * * *